United States Patent
Minassa et al.

(10) Patent No.: US 12,110,763 B2
(45) Date of Patent: Oct. 8, 2024

(54) LOW POWER CONSUMPTION ELECTRO-HYDRAULIC SYSTEM WITH MULTIPLE SOLENOIDS

(71) Applicant: Halliburton Energy Services, Inc., Houston, TX (US)

(72) Inventors: Lorenzzo Breda Minassa, Tomball, TX (US); Robert William Gissler, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/529,801

(22) Filed: Dec. 5, 2023

(65) Prior Publication Data
US 2024/0102354 A1   Mar. 28, 2024

Related U.S. Application Data (62) Division of application No. 17/645,224, filed on Dec. 20, 2021, now Pat. No. 11,885,200.

(Continued)

(51) Int. Cl.
*E21B 34/06* (2006.01)
*E21B 23/04* (2006.01)
(Continued)

(52) U.S. Cl.
CPC ............ *E21B 34/066* (2013.01); *E21B 23/04* (2013.01); *E21B 33/0355* (2013.01);
(Continued)

(58) Field of Classification Search
CPC .... E21B 34/066; E21B 23/04; E21B 33/0355; E21B 34/10; E21B 2200/02; E21B 34/14;
(Continued)

(56) References Cited

U.S. PATENT DOCUMENTS

| | | | |
|---|---|---|---|
| 1,372,502 A | 3/1921 | Willibald | |
| 3,788,341 A | * 1/1974 | Athy, Jr. | ........... F16K 31/36 137/488 |

(Continued)

FOREIGN PATENT DOCUMENTS

| | | |
|---|---|---|
| CA | 1276874 | 11/1990 |
| CN | 106593301 | 4/2017 |

(Continued)

OTHER PUBLICATIONS

"HS Interval Control Valves", Halliburton, Jan. 1, 2017, 2 pages.
(Continued)

*Primary Examiner* — Jessica Cahill
(74) *Attorney, Agent, or Firm* — DeLizio, Peacock, Lewin & Guerra, LLP (57) ABSTRACT

An electro-hydraulic control system for actuating a control valve includes a control module. The control module is coupled to the surface via at least one hydraulic line and two electrical power lines. The control module uses one of the hydraulic lines as a "supply" line and the other line as a "return" line if included. Each hydraulic line of the at least one hydraulic lines can be used as an "open" line or a "close" line to open or close the control valve. The control module includes two normally closed (NC) solenoid valves (SOVs) that are coupled to the electrical power lines and can be controlled from the surface to open or close. The opening or closing of the NC SOVs in cooperation with hydraulic pressure on a "supply" line of the hydraulic lines operates (i.e., closes or opens) the control valve.

8 Claims, 4 Drawing Sheets

Related U.S. Application Data (60) Provisional application No. 63/141,630, filed on Jan. 26, 2021, provisional application No. 63/141,624, filed on Jan. 26, 2021, provisional application No. 63/141,615, filed on Jan. 26, 2021, provisional application No. 63/141,618, filed on Jan. 26, 2021, provisional application No. 63/141,635, filed on Jan. 26, 2021.

(51) Int. Cl.
| | | |
|---|---|---|
| *E21B 33/035* | (2006.01) | |
| *E21B 34/10* | (2006.01) | |
| *E21B 34/14* | (2006.01) | |
| *E21B 34/16* | (2006.01) | |
| *F16K 31/40* | (2006.01) | |
| *G05D 16/20* | (2006.01) | |

(52) U.S. Cl.
CPC .............. *E21B 34/10* (2013.01); *E21B 34/14* (2013.01); *F16K 31/40* (2013.01); *G05D 16/2022* (2019.01); *G05D 16/204* (2013.01); *E21B 34/16* (2013.01); *E21B 2200/02* (2020.05)

(58) Field of Classification Search
CPC ... G05D 16/2022; G05D 16/204; F16K 31/40
See application file for complete search history.

(56) References Cited

U.S. PATENT DOCUMENTS

| | | | |
|---|---|---|---|
| 4,579,177 A | 4/1986 | Going, III | |
| 4,736,791 A | 4/1988 | Rorden | |
| 4,798,247 A | 1/1989 | Deaton et al. | |
| 4,856,595 A * | 8/1989 | Upchurch ............... | E21B 34/16 166/264 |
| 4,942,926 A | 7/1990 | Lessi | |
| 4,945,995 A | 8/1990 | Tholance et al. | |
| 5,050,681 A | 9/1991 | Skinner | |
| 5,065,825 A | 11/1991 | Bardin et al. | |
| 6,053,202 A | 4/2000 | Cunningham | |
| 6,179,052 B1 | 1/2001 | Purkis et al. | |
| 6,470,970 B1 | 10/2002 | Purkis et al. | |
| 6,715,558 B2 | 4/2004 | Williamson | |
| 7,219,591 B2 | 5/2007 | Loedige et al. | |
| 7,503,385 B2 * | 3/2009 | Tips ...................... | E21B 23/042 166/319 |
| 10,605,048 B2 | 3/2020 | Macgregor et al. | |
| 10,745,998 B2 | 8/2020 | Prost et al. | |
| 11,125,254 B2 * | 9/2021 | Erikksson .......... | F15B 13/0435 |
| 11,274,526 B2 | 3/2022 | Deville et al. | |
| 11,435,765 B2 | 9/2022 | Patz et al. | |
| 11,536,112 B2 | 12/2022 | Clayton et al. | |
| 11,591,884 B2 | 2/2023 | Clayton et al. | |
| 11,732,550 B2 | 8/2023 | Minassa et al. | |
| 11,773,687 B2 | 10/2023 | Minassa et al. | |
| 2001/0037884 A1 | 11/2001 | Schultz et al. | |
| 2002/0007946 A1 | 1/2002 | Purkis et al. | |
| 2005/0178560 A1* | 8/2005 | Johansen ............ | E21B 33/0355 166/374 |
| 2006/0168955 A1 | 8/2006 | Longfield et al. | |
| 2006/0201321 A1 | 9/2006 | Loedige et al. | |
| 2006/0254763 A1 | 11/2006 | Tips et al. | |
| 2007/0163774 A1 | 7/2007 | Hosatte et al. | |
| 2009/0283276 A1 | 11/2009 | Mandrou et al. | |
| 2010/0059233 A1 | 3/2010 | Smithson et al. | |
| 2010/0084588 A1* | 4/2010 | Curtiss, III ............ | E21B 34/16 251/57 |
| 2010/0236790 A1 | 9/2010 | Smithson | |
| 2011/0098946 A1 | 4/2011 | Curtiss, III | |
| 2012/0067593 A1 | 3/2012 | Powell et al. | |
| 2012/0073670 A1 | 3/2012 | Lymberopoulos | |
| 2015/0308212 A1 | 10/2015 | Maunus et al. | |
| 2017/0022790 A1 | 1/2017 | Leitch | |
| 2018/0051536 A1 | 2/2018 | Macgregor et al. | |
| 2018/0119522 A1 | 5/2018 | Prost et al. | |
| 2019/0055812 A1 | 2/2019 | Halily et al. | |
| 2019/0316433 A1 | 10/2019 | Schroit et al. | |
| 2020/0190943 A1 | 6/2020 | Clayton et al. | |
| 2020/0217157 A1 | 7/2020 | Oser et al. | |
| 2020/0248533 A1 | 8/2020 | Clayton et al. | |
| 2021/0102440 A1 | 4/2021 | Minassa et al. | |
| 2021/0190099 A1 | 6/2021 | Orth et al. | |
| 2021/0254431 A1 | 8/2021 | Prost | |
| 2022/0017051 A1 | 1/2022 | Kim | |

FOREIGN PATENT DOCUMENTS

| | | |
|---|---|---|
| EP | 2324192 | 5/2018 |
| GB | 2297568 | 8/1996 |
| WO | 9747852 | 12/1997 |
| WO | 2006124024 | 11/2006 |
| WO | 2010042298 | 4/2010 |
| WO | 2019226160 | 11/2019 |
| WO | 2019246501 | 12/2019 |
| WO | 2022164551 | 8/2022 |
| WO | 2022164592 | 8/2022 |
| WO | 2022164593 | 8/2022 |
| WO | 2022164594 | 8/2022 |
| WO | 2022164595 | 8/2022 |

OTHER PUBLICATIONS

"Intelligent Completions: SmartWell Completion Systems", Halliburton, Jan. 1, 2013, 8 pages.
"PCT Application No. PCT/US2021/064576, International Preliminary Report on Patentability", Aug. 10, 2023, 6 pages.
"PCT Application No. PCT/US2021/064576, International Search Report and Written Opinion", May 31, 2022, 9 pages.
"PCT Application No. PCT/US2021/073048, International Preliminary Report on Patentability", Aug. 10, 2023, 7 pages.
"PCT Application No. PCT/US2021/073048, International Search Report and Written Opinion", Apr. 19, 2022, 11 pages.
"PCT Application No. PCT/US2021/073049, International Preliminary Report on Patentability", Aug. 10, 2023, 7 pages.
"PCT Application No. PCT/US2021/073049, International Search Report and Written Opinion", Apr. 19, 2022, 10 pages.
"PCT Application No. PCT/US2021/073051, International Preliminary Report on Patentability", Aug. 10, 2023, 6 pages.
"PCT Application No. PCT/US2021/073051, International Search Report and Written Opinion", Apr. 18, 2022, 10 pages.
"PCT Application No. PCT/US2021/073054, International Preliminary Report on Patentability", Aug. 10, 2023, 6 pages.
"PCT Application No. PCT/US2021/073054, International Search Report and Written Opinion", Apr. 15, 2022, 10 pages.
"Product Details: Piloting Solenoid Valve SDBB2131002A", The Lee Company, http://leecat.theleeco.com/ecatalog/piloting-solenoid-valves/en/SDBB2131002A, Jan. 1, 2011, 2 pages.
"SmartPlex® Downhole Control System", Halliburton, Jan. 1, 2015, 2 pages.
"Technical Hydraulic Handbook (12th ed.)", The Lee Company, Jan. 1, 2018, 819 pages.
"US Application No. 17/645, 196, Restriction Requirement", Mar. 22, 2023, 7 pages.
"U.S. Appl. No. 17/645,224, Ex Parte Quayle", Aug. 31, 2023, 7 pages.
"U.S. Appl. No. 17/645,224, Requirement for Restriction or Election", Aug. 3, 2023, 6 pages.
"U.S. Appl. No. 17/645,259, Ex Parte Quayle", Mar. 2, 2023, 7 pages.
"U.S. Appl. No. 17/645,289, Restriction Requirement", Apr. 20, 2023, 7 pages.

* cited by examiner

LOW POWER CONSUMPTION ELECTRO-HYDRAULIC SYSTEM WITH MULTIPLE SOLENOIDS

RELATED APPLICATIONS

This application is a divisional application of U.S. patent application Ser. No. 17/645,224, filed Dec. 20, 2021, which claims the benefit of each one of U.S. Provisional Application Ser. No. 63/141,615 2012 filed Jan. 26, 2021, U.S. Provisional Application Ser. No. 63/141,618 filed Jan. 26, 2021, U.S. Provisional Application Ser. No. 63/141,624 filed Jan. 26, 2021, U.S. Provisional Application Ser. No. 63/141,630 filed Jan. 26, 2021, and U.S. Provisional Application Ser. No. 63/141,635 filed Jan. 26, 2021, each of which is incorporated herein in their entirety.

TECHNICAL FIELD

The disclosure generally relates to the field of obtaining hydrocarbons (e.g., as oil or gas) from wells and, more specifically, to methods and equipment for completion of wellbores and control and improvement of production.

BACKGROUND

Various tools and tool systems have been developed to control, select, and/or regulate the production of hydrocarbon fluids and other fluids produced downhole from subterranean wells. Downhole well tools such as sliding sleeves, sliding windows, interval control valves, safety valves, lubricator valves, and gas lift valves are examples of control tools positioned downhole in wells.

Sliding sleeves and similar devices are placed in isolated sections of the wellbore to control fluid flow from the wellbore section. Multiple sliding sleeves and at least one interval control valve (ICV) can be placed in different isolated sections within tubing to jointly control fluid flow within the particular tubing section, and to commingle the various fluids within a common tubing interior.

BRIEF DESCRIPTION OF THE DRAWINGS

Embodiments of the disclosure may be better understood by referencing the accompanying drawings.

DESCRIPTION OF EMBODIMENTS

The description that follows includes example systems and methods that embody examples of the disclosure. However, it is understood that this disclosure may be practiced without these specific details. For instance, this disclosure refers to electro-hydraulic circuits for controlling an interval control valve (ICV) in a completion system in illustrative examples. The embodiments of this disclosure can be also applied to controlling other downhole valves or instruments and can be implemented in any system combining hydraulic power and electric power. In other instances, well-known instruction instances, protocols, structures, and techniques have not been shown in detail in order not to obfuscate the description.

Systems for controlling multiple downhole tools, particularly ICVs, can include electric and hydraulic lines (electro-hydraulic systems). These systems use substantial power to control the downhole tools. A dual solenoid electro-hydraulic control system is disclosed herein that controls downhole tools with low power consumption. The system's power consumption can be low enough to be compatible with disconnect tools using inductive coupling.

In the disclosed electro-hydraulic control system, a control module is hydraulically coupled to an ICV to control the ICV. The control module is coupled to the surface via two hydraulic lines and two electrical power lines. The control module uses one hydraulic line as a "supply" line and the other line as a "return" line in the two-hydraulic line configuration. The control module includes two normally closed (NC) solenoid valves (SOVs), each coupled to one of the two electrical power lines, that can be controlled from the surface to open or close. The opening and closing of the two NC SOVs is controlled in cooperation with pressure being applied to at least one hydraulic line to operate (i.e., close or open) the ICV. Either hydraulic line can function as an "open" line or a "close" line referring to an opening or closing of the ICV. The control module can operate with a single hydraulic line in operable condition; should one of the hydraulic lines become damaged in a redundant multi-hydraulic line configuration, the control module can operate with the remaining hydraulic line(s).

The phrasing "hydraulically coupled with" refers to the coupling of components with a fluid conduit that is charged or under pressure and allows for the variations that may occur in various implementations. For instance, "component A is hydraulically coupled with component B" encompasses these non-limiting cases: A directly connected to B by a hydraulic conduit or A connected to B with one or more intervening components and multiple conduits therebetween.

Example Illustrations

Figure 1:
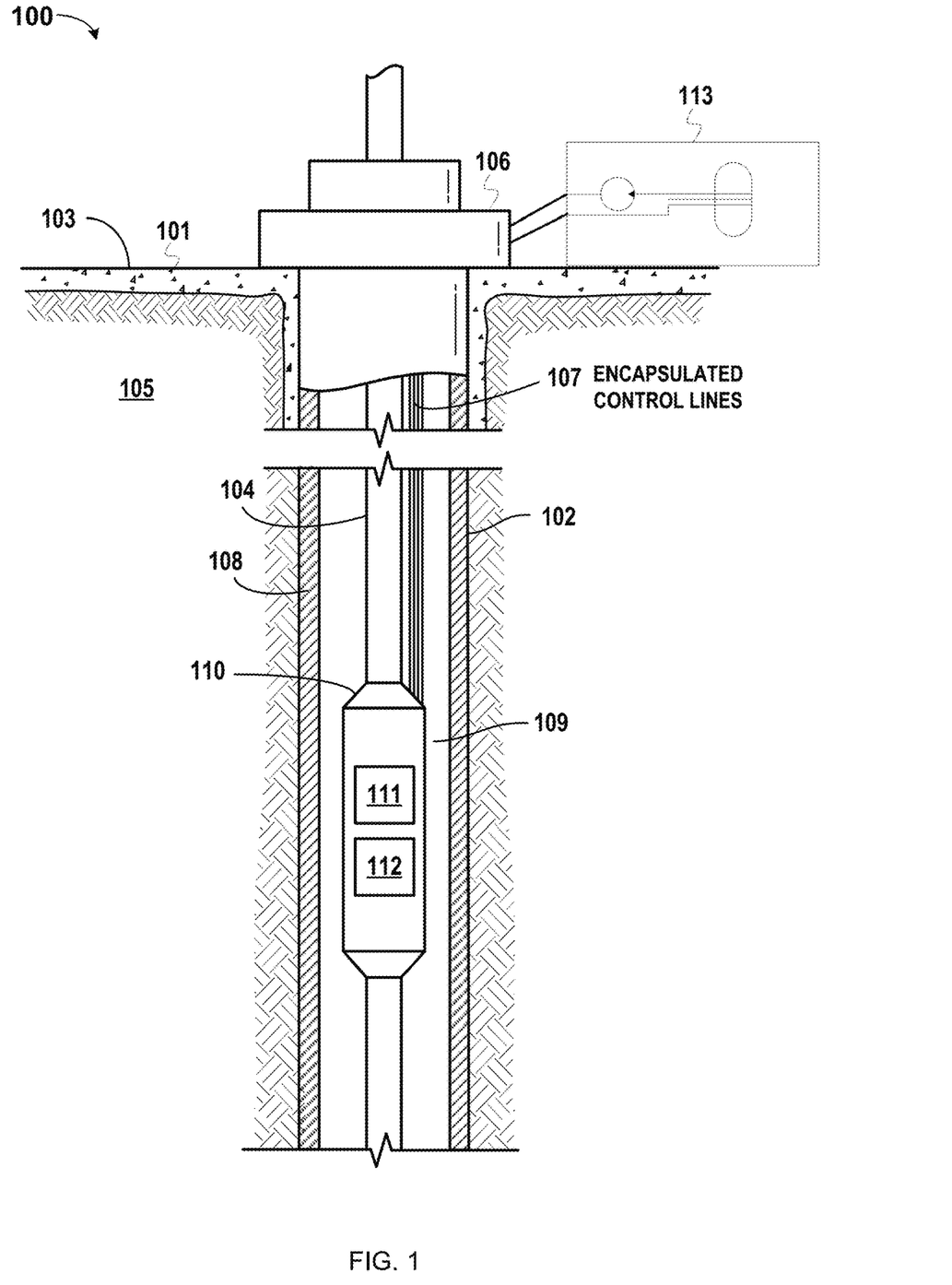
FIG. 1 depicts a partial cross-sectional view of a well completion.

FIG. 1 depicts a partial cross-sectional view of a well completion 100 that includes a low power electro-hydraulic circuit with two SOVs that control an ICV 112. The electro-hydraulic circuit is formed with a hydraulic power system 113, encapsulated control lines 107, and a control module/hydraulic manifold assembly 111. An ICV 112 controlled via the control module 111 can be considered part of the circuit or external to the circuit. The well completion 100 includes a wellbore 102 extending through, i.e., formed in, a subterranean formation 105 from a wellhead 106 located at a surface 103. The wellbore 102 includes a casing string 108. The casing string 108 can be at least partially cemented into the subterranean formation with cement 101. Although cement 101 is shown near the surface 103, the cement can extend the length of the wellbore 102. Although the wellbore 102 is depicted as a single vertical wellbore, the wellbore 102 can include deviated or horizontal portions. Although only one casing string 108 is shown, multiple casing strings may be radially and/or circumferentially disposed around casing string 108.

A tubing string 104 is positioned in the wellbore 102 inside the casing string 108, forming an annulus 109 between the tubing string 104 and the casing string 108. A completion component or sub-assembly ("sub") 110 is included in (or physically coupled to) the tubing string 104.

Both the completion sub 110 and the tubing string 104 collectively (possibly with other completion subs and joined tubing) form the tubing string of the well completion 100.

Encapsulated control lines 107 extend from the surface 103 of the wellbore 102 to the completion sub 110. The control lines 107 at least include two electrical power lines and at least one hydraulic line. The control lines 107 can communicatively couple the completion sub 110 to a computing device that actuates a downhole tool, e.g., one or more valves. Hydraulic lines of the control lines 107 are coupled to the hydraulic system 113 and the control module 111. The hydraulic power system 113 converts mechanical energy into hydraulic energy that is provided to the control module 111 via at least one of the hydraulic lines of the control lines 107.

The completion sub 110 includes the control module 111 and the ICV 112. The control module 111 is hydraulically coupled to the ICV 112 and includes portions of the control lines 107. Although shown as components of the completion sub 110, the control module 111 and/or the ICV 112 can be each coupled directly to the tubing string 104 and/or to one another, e.g., via threaded ends.

The ICV 112 controls flow between an interior and exterior of the tubing string 104. For example, the exterior of the ICV 112 can be exposed to the annulus 109 and the ICV 112 can regulate flow between the interior of the tubing string 104 and the annulus 109.

Figure 2:
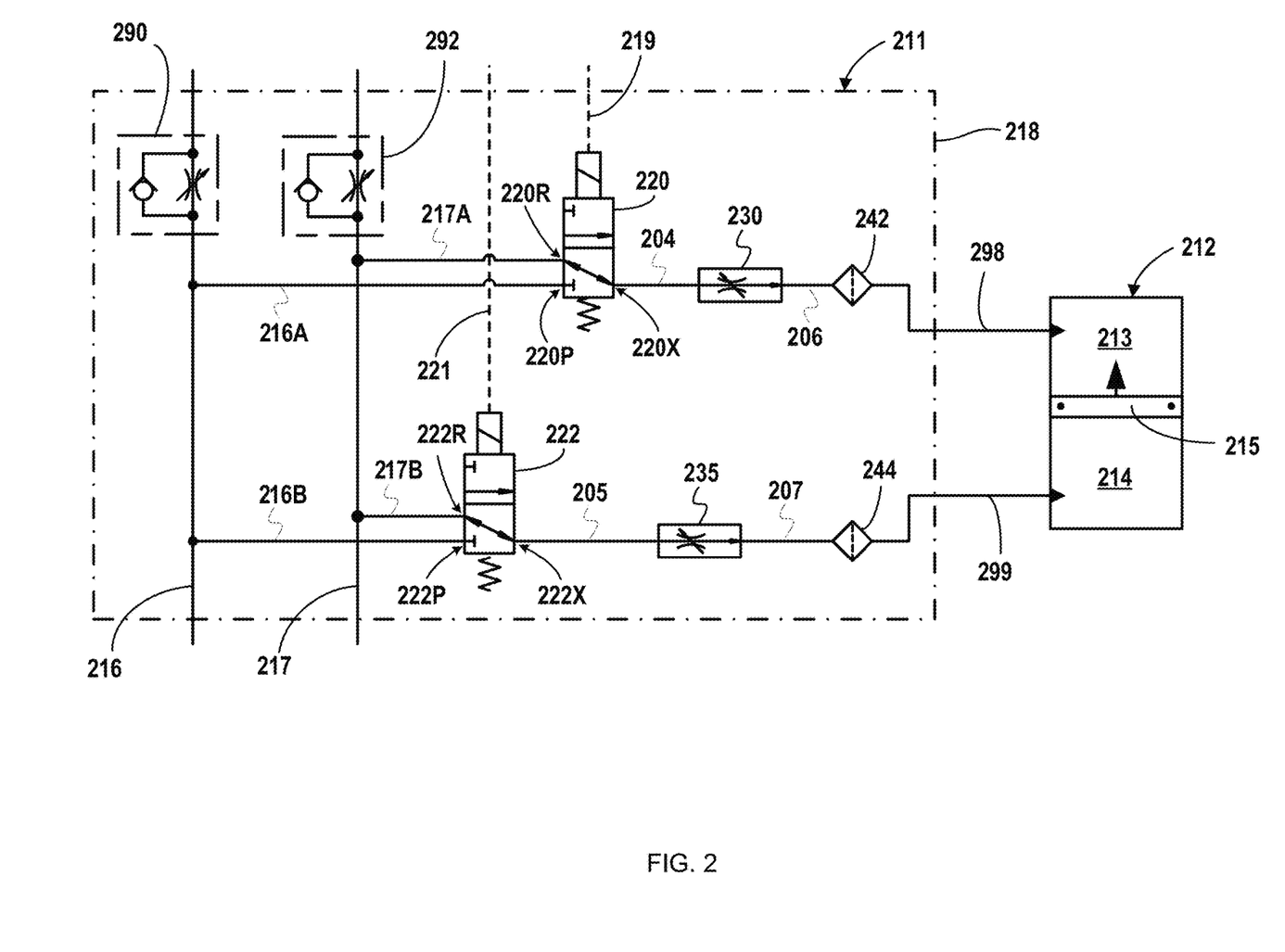
FIG. 2 depicts a first electro-hydraulic circuit for controlling an ICV.

FIG. 2 depicts components of a control module of an electro-hydraulic circuit with two three-way normally closed solenoid valves for actuating an ICV. A control module 211 includes a housing 218. The housing 218 can be coupled to tubing. The housing 218 protects the components of the control module 211. The components of the control module 211 include a normally closed (NC) solenoid valve (SOV) 220, a NC SOV 222, a dynamic flow regulator 230, a dynamic flow regulator 235, a filter 242, a filter 244, a one-way flow regulator 290, and a one-way flow regulator 292. The components of the control module 211 are disposed within the housing 218.

A hydraulic line 216 and a hydraulic line 217 route through the control module 211. A "hydraulic line" as used herein refers to a hydraulic fluid conduit implemented as appropriate for the environment (e.g., a steel line or a hydraulic hose). FIG. 2 depicts the hydraulic lines 216, 217 entering and exiting the housing 218 via separate apertures. Embodiments may route the hydraulic lines 216, 217 through shared apertures. Each of the hydraulic lines 216, 217 branches within the housing 218. The hydraulic lines 216, 217 each branch to connect to different ports of the NC SOV 220. Each of the hydraulic lines 216, 217 also branch to connect to different ports of the NC SOV 222. The hydraulic lines 216, 217 route through one-way flow regulators 290 and 292, respectively. For the branching of the hydraulic lines, embodiments can use a tee or a flow divider. The dynamic flow regulators provide flow control to ensure that the hydraulic circuit conforms to an operating range of pressures even with branching/splitting with tees. An electrical power line 219 and an electrical power line 221 route into the control module 211 through an aperture(s) of the housing 218 to connect to NC SOVs 220 and 222, respectively. The dual NC SOV configuration provides redundancy and allows for actuation of the ICV 212 with a single hydraulic line and single energized NC SOV. Should a hydraulic line fail or suffer structural damage, the damaged and/or ineffective line can be used as the return line and the remaining hydraulic line retaining proper function then becomes the supply line. A hydraulic line 298 connects filter 242 to the ICV 212, and a hydraulic line 299 connects filter 244 to the ICV 212.

The ICV 212 is divided into two sides, an open side 214 and a close side 213, by a double actuated floating piston 215. The movement of the double-actuated floating piston 215 controls flow of fluid between the interior of a tubing string and an annulus. For example, movement of the double-actuated floating piston 215 towards the close side 213 increases flow between the interior of the tubing string and the annulus, and movement of the double-actuated floating piston 215 towards the open side 214 reduces flow between the interior of the tubing string and the annulus The double actuated floating piston 215 of the ICV 212 can be fully closed, i.e., fully blocking flow between the interior of the tubing string and the annulus, or fully open to allow maximum flow between the interior of the tubing string and the annulus.

As depicted, both NC SOV 220 and NC SOV 222 are two-position, three-way NC SOVs. NC SOV 220 has a pressure port or P-port 220P, a return port or R-port 220R, and a control port or X-port 220X. NC SOV 222 has a pressure port or P-port 222P, a return port or R-port 222R, and a control port or X-port 222X. The control port of each SOV can also be referred to as a "C-port" instead of an X-port.

Each NC SOV has two states, an energized state and a deenergized state, corresponding to the two positions of the valve. In the deenergized state, each NC SOV 220, 222 is in a first, closed valve position that blocks hydraulic communication between the P-port and the X-port but allows hydraulic communication between the X-port and the R-port. In the energized state, each NC SOV 220, 222 is in a second, open valve position that allows hydraulic communication between the P-port and the X-port. The NC SOV 220 can be energized via the electrical power line 219. A controller and an electrical power source that controls the NC SOVs 220, 222 can be disposed on the surface or at a location remote from the well. Similarly, the NC SOV 222 can be energized via the electrical power line 221 from the same or a different controller and the electrical power source to energize or deenergize the NC SOV 222.

Hydraulic line branches throughout the electro-hydraulic circuit connect hydraulic line 216 and hydraulic line 217 to components within the system. A hydraulic line branch 216A connects hydraulic line 216 to the P-port 220P of NC SOV 220. A hydraulic line branch 216B connects hydraulic line 216 to the P-port 222P of NC SOV 222. A hydraulic line branch 217A connects hydraulic line 217 to the R-port 220R of NC SOV 220, and a hydraulic line branch 217B connects hydraulic line 217 to the R-port 222R of NC SOV 222. The one-way flow regulators 290 and 292 are disposed prior to the hydraulic line branches for 216A, 217A. At least one of one-way flow regulator 290 or one-way flow regulator 292 is composed of an adjustable flow regulator and bypass check valve, i.e., allowing unrestricted flow in a first direction but restricted flow in a second direction.

Each dynamic flow regulator 230, 235, has an automatically adjustable variable-metering orifice which is configured to provide a constant volumetric flow rate therethrough. Each dynamic flow regulator 230, 235 senses the flow rate in terms of a differential pressure across a fixed orifice, and the variable metering orifice automatically adjusts to keep the volumetric flow rate constant therethrough over a range of pressure differentials across the dynamic flow regulators. The dynamic flow regulators 230, 235 protect the NC SOVs 220, 222 and can also be used to provide bidirectional choke capability to the ICV 212. A hydraulic line 204 connects a first port of the dynamic flow regulator 230 to the X-port 220X of NC SOV 220, and a hydraulic line 205 connects a first port of the dynamic flow regulator 235 to the X-port 222X of the NC SOV 222. A hydraulic line 206 connects a second port of the dynamic flow regulator 230 to the filter 242, and a hydraulic line 207 connects a second port of the dynamic flow regulator 235 to the filter 244.

The X-port 220X of the NC SOV 220 is hydraulically coupled to the dynamic flow regulator 230, and the X-port 222X of the NC SOV 222 is hydraulically coupled to the dynamic flow regulator 235. Filter 242 is coupled between the close side 213 of the ICV 212 via hydraulic line 298 and the dynamic flow regulator 230 via the hydraulic line 206, and the filter 244 is coupled between the open side 214 of the ICV 212 via hydraulic line 299 and the dynamic flow regulator 235 via the hydraulic line 207. At least one of the filter 242 and the filter 244 can be a bidirectional filter. These filters are used to filter debris from the ICV and can utilize a dump line or bypass valve if either filter was to clog. The filters are supplementary to the electro-hydraulic circuit design and can be removed without impeding system functionality.

The one-way flow regulator 290 is oriented to allow unrestricted pressure supply on hydraulic line 216 into the control module 211 but restricts pressure (and therefore fluid flow) on hydraulic line 216 out of the control module (e.g., proceeding towards the surface or uphole). One-way flow regulator 292 is oriented to allow unrestricted pressure supply from hydraulic line 217 into the control module 211 but restricts pressure supply on the hydraulic line 217 from the electro-hydraulic circuit attempting to travel uphole (i.e., attempting to exit the control module 211). Each one-way flow regulator 290, 292 comprises an interior bypass check valve which allows the flow regulator to restrict excess pressure supplied from the circuit beyond what is permitted by the flow regulator. The one-way flow regulators 290, 292 allow ingress pressure (e.g., supplied from uphole) to pass through without restriction. One-way flow regulator 290 and one-way flow regulator 292 can mitigate potential damage and/or leak effects to hydraulic line 216 and hydraulic line 217, respectively.

In operation, hydraulic line 216 can function as a supply line, and hydraulic line 217 is included to function as a return line. Building pressure on hydraulic line 216 while both the NC SOV 220 and NC SOV 222 are deenergized results in no movement of ICV 212, as the P-ports 220P and 222P will block flow to the ICV 212 when both NC SOVs 220, 222 are deenergized. Likewise, building pressure on hydraulic line 216 while both NC SOV 220 and NC SOV 222 are energized also results in no movement of the ICV 212, as there will be equal pressure on both the close side 213 and the open side 214 through the unimpeded flow through the energized NC SOVs 220, 222.

To actuate the ICV 212 in a close direction, hydraulic line 216 is pressurized and NC SOV 220 is energized to allow hydraulic communication between the P-port 220P and the X-port 220X while NC SOV 222 remains deenergized. NC SOV 220 is energized via electrical power line 219. With NC SOV 220 energized, pressure supplied from hydraulic line 216 forces fluid through hydraulic line branch 216A to the P-port 220P of the NC SOV 220, where flow is further directed to the X-port 220X and on through the dynamic flow regulator 230 via hydraulic line 204. This flow or hydraulic pressure continues to the filter 242 via hydraulic line 206 to the close side 213 of the ICV 212 via the hydraulic line 298. As differential pressure across the double-actuated floating piston 215 builds, pressure on the close side 213 will apply force on the double-actuated floating piston 215 and force fluid within the open side 214 out of the ICV 212 through filter 244 via hydraulic line 299, through the dynamic flow regulator 235 via hydraulic line 207, and to the X-port 222X of the NC SOV 222 via the hydraulic line 205. Flow continues through the deenergized NC SOV 222 from X-port 222X towards R-port 222R. From the R-port 222R, pressure on the double-actuated floating piston 215 exerted by hydraulic line 216 further applies force or pushes fluid through the hydraulic line branch 217B to hydraulic line 217 where pressure is relieved as return flow vents from the control module 211 towards a hydraulic power system via the one-way flow regulator 292. In one or more embodiments, a second hydraulic line is not utilized, and the return flow from R-port 222R is ported to an annulus.

To actuate the ICV 212 in an open direction, hydraulic line 216 is pressurized and NC SOV 222 is energized via electrical power line 221 while the NC SOV 220 remains deenergized. With the NC SOV 222 energized, pressure from hydraulic line 216 forces fluid through hydraulic line branch 216B to the NC SOV 222 where fluid moves from P-port 222P to X-port 222X, through the dynamic flow regulator 235, and through filter 244 to the open side 214 of the ICV 212. The pressure on the double actuated floating piston 215, supplied by hydraulic line 216, builds in the open side 214. As the pressure differential across the double-actuated piston 215 increases, pressure from hydraulic line 216 pushes the double-actuated piston 215 upwards. Fluid within the close side 213 is forced out of the ICV 212 to the filter 242 via the hydraulic line 298, to the dynamic flow regulator 230 via the hydraulic line 206, and to the NC SOV 220 via the hydraulic line 204 where flow continues from the X-port 220X towards the R-port 220R. Hydraulic line 217 is connected to R-port 220R via hydraulic line branch 217A and return flow from the close side 213 can vent from the control module 211 towards a hydraulic power system via one-way flow regulator 292. In one or more embodiments, a second hydraulic line is not utilized, and the return flow from R-port 220R is ported to an annulus to relieve pressure within the circuit.

In both directions of movement, movement of the ICV 212 can be halted by deenergizing the NC SOVs. Deenergizing NC SOV 220 halts closing of the ICV 212, and deenergizing NC SOV 222 halts opening of the ICV 212. This is because the electro-hydraulic circuit described by FIG. 2 uses a pressure differential in the system to influence the movement of fluid and therefore movement of the double-actuated floating piston 215. Energizing both NC SOVs would equalize pressure across the entire circuit, and deenergizing both NC SOVs would prevent pressure from a hydraulic supply line (either hydraulic line 216 or hydraulic line 217) from circulating through the system; pressure from hydraulic line 216 as the supply line would be unable to reach the ICV 212, and pressure from hydraulic supply line 217 as the supply line would be unable to move the double-actuated floating piston 215 since both the open and close side of the ICV would receive fluid exerted at a near-identical pressure from the supply line. Pressure would quickly equalize across the circuit, and more specifically, the piston.

The hydraulic lines are interchangeable with respect to which line is the supply line and which is the return line, as mentioned above. Hydraulic line 217 can function as the supply line with hydraulic line 216 functioning as the return line, and the electro-hydraulic circuit would retain its functionality in actuating the ICV in either direction. In this configuration with hydraulic line 217 pressurized, movement in the open direction can be accomplished by energizing the NC SOV 220 to allow return flow from the close side 213 to vent through the filter 242, dynamic flow regulator 230, through energized NC SOV 220 from X-port 220X to P-port 220P, and through hydraulic line branch 216A until reaching the return line in this instance, hydraulic line 216. Likewise, in this configuration, movement in the close direction can be accomplished by energizing NC SOV 222 to allow return flow from the open side 214 to vent through the filter 244, dynamic flow regulator 235, through the energized NC SOV 222 from the X-port 222X to the P-port 222P, and through hydraulic line branch 216B until reaching hydraulic line 216.

As the electro-hydraulic circuit 200 disclosed above does not require two hydraulic lines (since the hydraulic line 217 is optional), the electro-hydraulic circuit 200 can be used in instances where it is necessary to reduce the number of control lines, e.g., since two electrical power lines are required to control the NC SOVs, the number of hydraulic lines in the system may be reduced to only a single hydraulic line.

Figure 3:
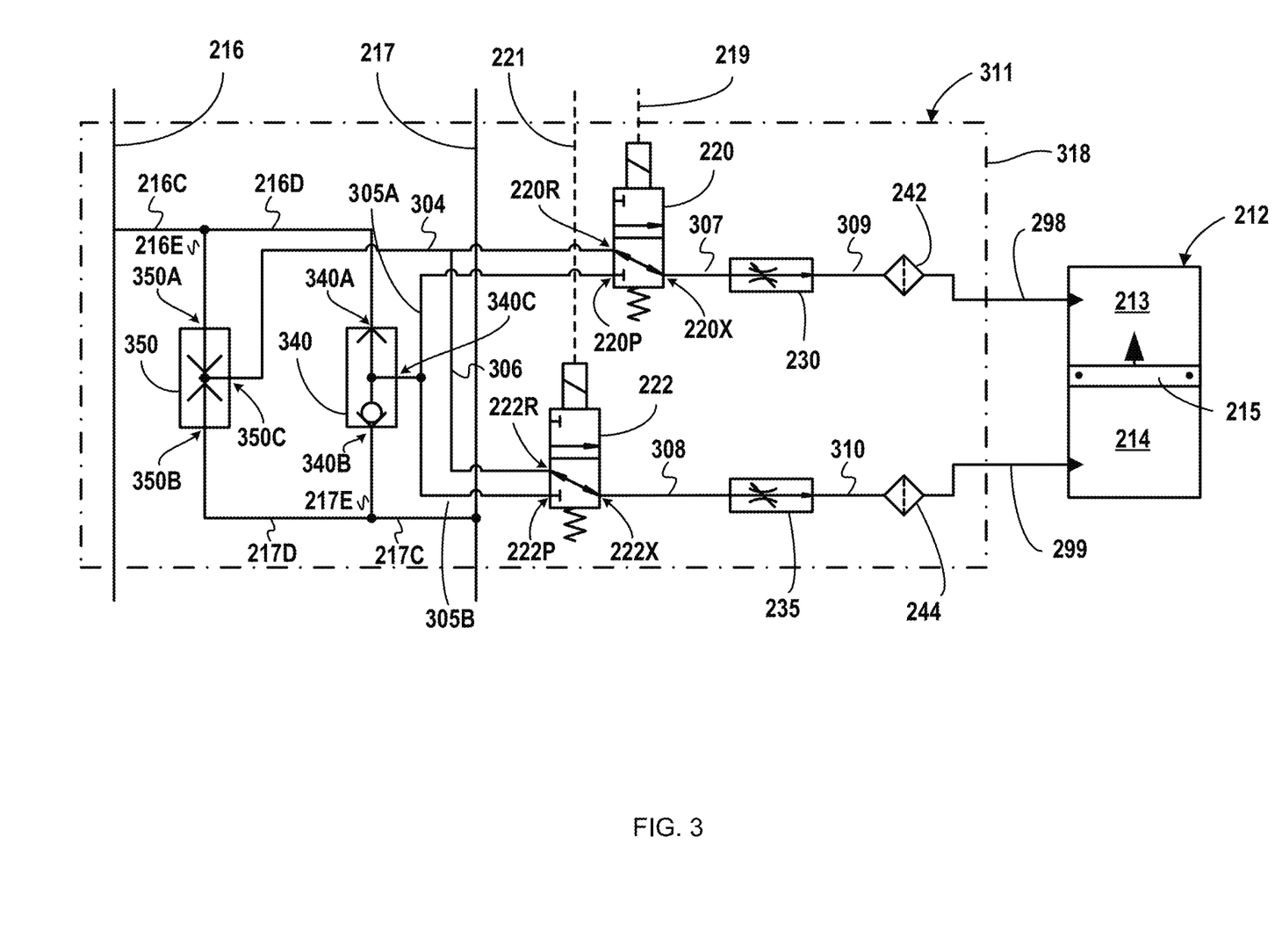
FIG. 3 depicts a second electro-hydraulic circuit for controlling an ICV.

FIG. 3 depicts a control module of an electro-hydraulic circuit with two three-way NC SOVs, a shuttle valve, and an inverse shuttle valve for actuating an ICV. The electro-hydraulic circuit illustrated in FIG. 3 includes a control module 311 that is similar to the control module 211 of FIG. 2. The components of the control module 311 include the two NC SOVs 220 and 222, the filters 242 and 244, and the dynamic flow regulators 230 and 235. Unlike the control module 211, the control module 311 includes a shuttle valve 340, and an inverse shuttle valve 350, but does not include one-way flow regulators.

The shuttle valve 340 has three ports: an A-port 340A, a B-port 340B, and a C-port 340C. The shuttle valve 340 includes internal components that allow hydraulic communication between A-port 340A and C-port 340C when the pressure on the A-port 340A exceeds the pressure on the B-port 340B. The shuttle valve 340 allows hydraulic communication between the B-port 340B and the C-port 340C when the pressure on the B-port 340B exceeds the pressure on the A-port 340A. Hydraulic communication between the ports of the shuttle valve 340 can be unidirectional or bidirectional.

The inverse shuttle valve 350 also has three ports: an A-port 350A, a B-port 350B, and a C-port 350C. The inverse shuttle valve 350 includes internal components that allow hydraulic communication between A-port 350A and C-port 350C when the pressure on the A-port 350A is less than the pressure on the B-port 350B. The inverse shuttle valve 350 also allows hydraulic communication between B-port 350B and C-port 350C when the pressure on the B-port 350B is less than the pressure on the A-port 350A. Hydraulic communication between the ports of the inverse shuttle valve 350 can be unidirectional or bidirectional, similar to the shuttle valve 340.

A-port 340A of the shuttle valve 340 and A-port 350A of the inverse shuttle valve 350 are both coupled to the hydraulic line 216. A hydraulic line branch 216C branches into hydraulic lines 216D, 216E. The hydraulic lines 216D, 216E respectively couple the A-port 340A of the shuttle valve 340 and A-port 350A of the inverse shuttle valve 350 to the line 216C. B-port 340B of the shuttle valve 340 and B-port 350B of the inverse shuttle valve 350 are both coupled to the hydraulic line 217. A hydraulic line branch 217C branches into hydraulic lines 217D, 217E. The hydraulic lines 217E, 217D respectively couple the B-port 340B of the shuttle valve 340 and B-port 350B of the inverse shuttle valve 350 to the line 217C. C-port 340C of the shuttle valve 340 is coupled to P-port 220P of the NC SOV 220 and to the P-port 222P of NC SOV 222 via a hydraulic line 305A and a hydraulic line 305B, respectively. C-port 350C of the inverse shuttle valve 350 is coupled to R-port 220R of NC SOV 220 via a hydraulic line 204 and to R-port 222R of NC SOV 222 via a hydraulic line 306.

Example operation of the electro-hydraulic circuit is now described. Either hydraulic line 216 or hydraulic line 217 can function as a pressure supply line for actuating an ICV in an open or close direction, and the other hydraulic line can function as the return line.

Building pressure on the supply line while both NC SOV 220 and NC SOV 222 are deenergized results in no movement of the ICV 212, as the P-ports 220P and 222P of the NC SOVs 220, 222 will block hydraulic communication between the ICV 212 and the pressure supply line when both NC SOVs are deenergized. Likewise, charging the supply line while both NC SOV 220 and NC SOV 222 are energized also results in no movement of the ICV 212, as there will be equal pressure on both the close side 213 and the open side 214 through the open flow of the energized NC SOVs from P-ports 220P and 222P to X-ports 220X and 222X, respectively.

To actuate the ICV 212 in a close direction, the supply line is pressurized and NC SOV 220 is energized via electrical power line 219 while NC SOV 222 remains deenergized. With NC SOV 220 energized, hydraulic communication between the supply line and the P-ports 220P and 222P of the NC SOVs 220, 222 is allowed. Depending on which hydraulic line is used for the pressure supply line, hydraulic communication can exist between either the A-port 340A or B-port 340B and the C-port 340C of the shuttle valve 340. If hydraulic line 216 is the pressure supply line, pressure on hydraulic line 216 will force fluid through the hydraulic line branch 216D where it enters the shuttle valve 340 at the A-port 340A. The pressure will force a ball within the shuttle valve 340 into a seat located over B-port 340B, effectively closing the port. Hydraulic communication is then allowed between the A-port 340A and C-port 340C before fluid flow is split along hydraulic lines 305A and 305B and travels to both NC SOVs 220, 222. If hydraulic line 217 is the pressure supply line, the pressure on hydraulic line 217 will force fluid through hydraulic lines 217C, 217E where it enters the shuttle valve 340 at B-port 340B. The pressure from hydraulic line 217 will force a ball within the shuttle valve 340 into a seat located over A-port 340A, effectively closing the port. Hydraulic communication is then allowed between the B-port 340B and the C-port 340C before fluid flow is split and travels to both NC SOVs. Since NC SOV 222 is deenergized, pressure from the supply line is halted at P-port 222P.

With the NC SOV 220 energized, pressure on the supply line forces fluid out from the C-port 340C of shuttle valve 340 through NC SOV 220 from the P-port 220P to the X-port 220X. Pressure continues to force fluid through a hydraulic line 307 to the dynamic flow regulator 230 and to the filter 242 via a hydraulic line 309. Flow continues to the close side 213 of the ICV 212 along hydraulic line 298. The pressure on the double-actuated floating piston 215 forces fluid within the open side 214 out of the ICV 212 to filter 244 via hydraulic line 299, to the dynamic flow regulator 235 via a hydraulic line 310, and to the X-port 222X of the NC SOV 222 via a hydraulic line 308. In the NC SOV 222, flow continues from X-port 222X through the R-port 222R.

Pressure supplied by hydraulic line 216 continues to direct fluid flow from the R-port 222R to the C-port 350C of the inverse shuttle valve 350 via a hydraulic line branch 306 and a hydraulic line branch 304 and on to the return line via either A-port 350A or B-port 350B (depending on which hydraulic line is used for the return line). The inverse shuttle valve functions inversely from a standard shuttle valve. For example, if hydraulic line 216 is the pressure supply line and hydraulic line 217 is the return line, then the higher pressure along hydraulic line branch 216D and A-port 350A will close the A-port 350A, and hydraulic communication will be permitted between C-port 350C and the B-port 350B, where the pressure forces fluid out of the electro-hydraulic circuit via the return line: hydraulic line 217. Likewise, when hydraulic line 216 is the return line, the lower pressure on A-port 350A of the inverse shuttle valve 350 will close the B-port 350B and hydraulic communication will be permitted between the C-port 350C and the A-port 350A, where pressure from the supply line will eventually force fluid out of the electro-hydraulic circuit and pressure will relieve via the return line, hydraulic line 216.

To actuate the ICV 212 in an open direction, the supply line is pressurized, and NC SOV 222 is energized via electrical power line 221 while NC SOV 220 remains deenergized. With NC SOV 222 energized, hydraulic communication between the supply line and the P-ports of the NC SOVs is allowed. Depending on which hydraulic line is used for the pressure supply line, hydraulic communication can exist between either the A-port 340A or B-port 340B and the C-port 340C. If hydraulic line 216 is the supply line, the pressure on the hydraulic line 216 will force fluid through the hydraulic line branch 216D where it enters the shuttle valve 340 at the A-port 340A. The pressure will force a ball within the shuttle valve 340 into a seat located over B-port 340B, effectively closing this port. Hydraulic communication is then allowed between the A-port 340A and C-port 340C before fluid flow is split and travels to both NC SOVs 220 and 222 via hydraulic lines 305A and 305B, respectively. If hydraulic line 217 is the pressure supply line, the pressure on the hydraulic line 217 will force fluid through hydraulic lines 217C, 217D where it enters the shuttle valve 340 at the B-port 340B. The pressure from hydraulic line 217 will force a ball within the shuttle valve 340 into a seat located over A-port 340A, effectively closing this port. Hydraulic communication is then allowed between B-port 340B and C-port 340C before fluid flow is split and travels to both NC SOVs. Since NC SOV 220 is deenergized, pressure from the supply line is halted at P-port 220P.

With the NC SOV 222 energized, pressure on the supply line forces fluid out from the C-port 340C of shuttle valve 340 through NC SOV 222 from P-port 222P to X-port 222X. Pressure continues to force fluid through the dynamic flow regulator 235 via hydraulic line 308, through the filter 244 via hydraulic line 310, and to the open side 214 of the ICV 212 via hydraulic line 299. The pressure on the double-actuated floating piston 215 forces fluid within the close side 213 out of the ICV 212 via hydraulic line 298 to the filter 242, to the dynamic flow regulator 230 via hydraulic line 309, and to the NC SOV 220 via hydraulic line 307 where flow through the NC SOV 220 proceeds from the X-port 220X towards the R-port 220R. Pressure supplied by the supply line continues to direct fluid flow from the R-port 220R to the C-port 350C of the inverse shuttle valve 350 via hydraulic line 304 and on to the return line via either A-port 350A or B-port 350B (depending on which hydraulic line is used for the return line). The inverse shuttle valve functions inversely from a standard shuttle valve. For example, if hydraulic line 216 is the pressure supply line and hydraulic line 217 is the return line, then the higher pressure along hydraulic line branch 216D and A-port 350A will close A-port 350A, and hydraulic communication will be permitted between the C-port 350C and the B-port 350B, where the supplied pressure forces fluid out of the electro-hydraulic circuit via the return line; hydraulic line 217. Likewise, when hydraulic line 216 is the return line, the lower pressure on A-port 350A of the inverse shuttle valve 350 will close the B-port 350B and hydraulic communication will be permitted between the C-port 350C and the A-port 350A. where pressure from the supply line will eventually force fluid out of the electro-hydraulic circuit via the return line, hydraulic line 216.

The ability of the disclosed electro-hydraulic circuits to use either hydraulic line provides redundancy in instances where there is danger of losing functionality of one of the hydraulic lines, e.g., due to shifts in the wellbore or a workover or treatment that damages the integrity of a hydraulic line.

Figure 4:
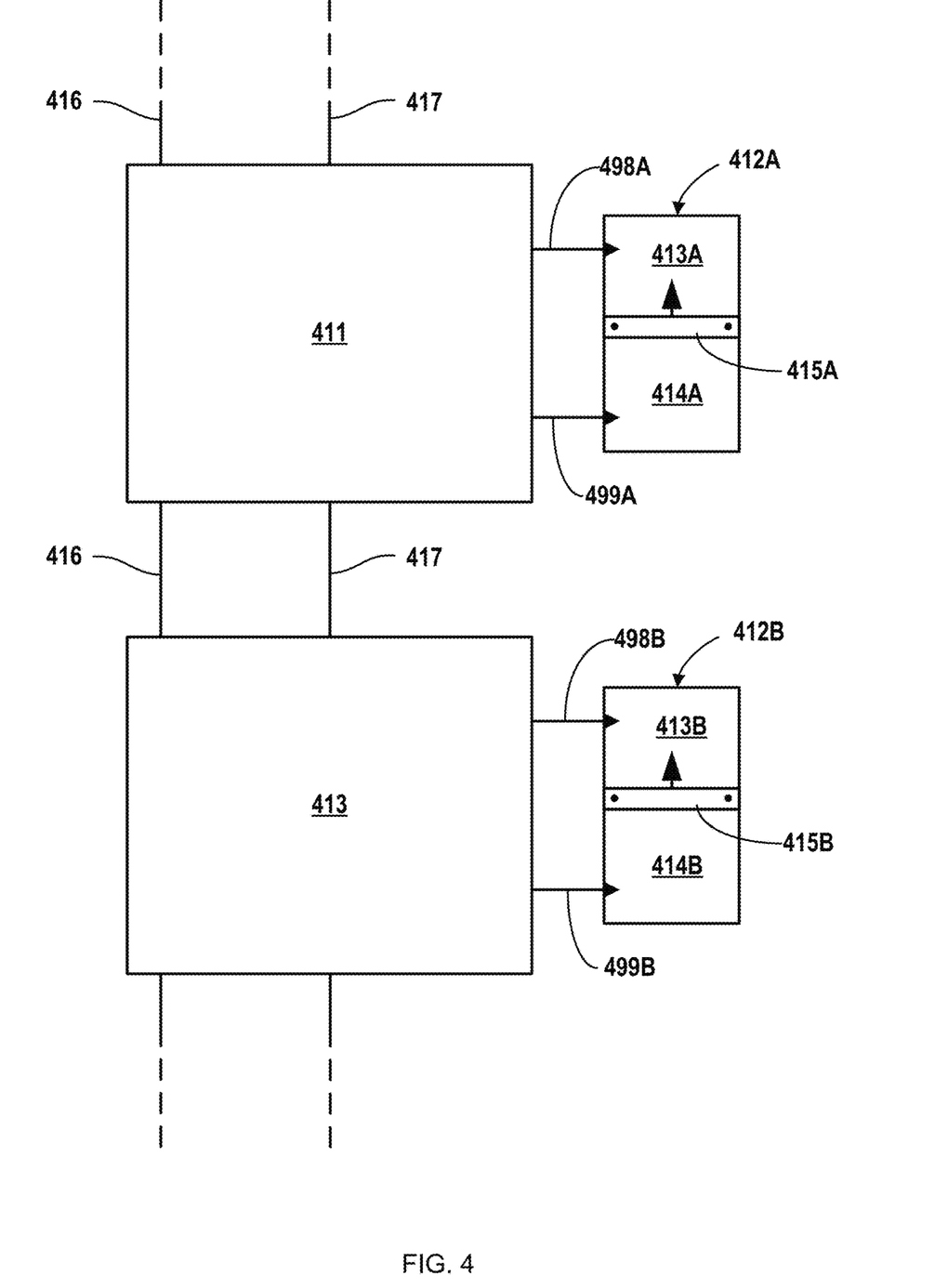
FIG. 4 depicts a plurality of control modules in a stacked configuration.

FIG. 4 depicts a plurality of electro-hydraulic control modules in a stacked configuration. Two control modules are shown: control module 411 and control module 413. Each of the control modules 411-413 are similar to either the control module 211 of FIG. 2, the control module 311 of FIG. 3, or a combination of the two (e.g., control module 411 can comprise components of control module 211 and control module 413 can comprise components of control module 311). Each control module is correlated to its own pay zone, i.e., hydrocarbon-producing formation, when in the stacked configuration. The control modules 411, 413 are hydraulically connected to ICVs 412A, 412B, respectively. The control module 411 is connected to the ICV 412A by hydraulic lines 498A, 499A. The control module 413 is connected to the ICV 412B by hydraulic lines 498B, 499B. The control modules 411, 413 are said to be "stacked" because shared hydraulic lines are used to activate more than one control module. As depicted in FIG. 4, either hydraulic line 416 or hydraulic line 417 can function as the supply line and the other as the return line. In an instance of damage to one of the hydraulic lines, the damaged line will be used as the return line and the undamaged line used as the supply line. In normal operation, either hydraulic line can be used as an open line or a close line to open or close the ICVs. The hydraulic line 416 and hydraulic line 417 can use a tee to branch to the control modules 411, 413. A dynamic flow regulator can be placed on hydraulic line 416 and/or hydraulic line 417 above and/or between control modules to provide flow control to facilitate conformance with an operating pressure range of the control modules. The placement of the dynamic flow regulator above and/or between control modules on hydraulic line 416 and/or hydraulic line 417 may depend on a variety of factors including the distance between control modules, the depth of a control module, and the pressure exerted on a control module by a hydraulic power system.

With an applied pressure on a hydraulic supply line, the NC SOVs in each of the control modules 411-413 can be controlled to open or close their respective ICV. For example, with hydraulic line 416 acting as a supply line, pressure can be exerted on the two control modules 411-413. With the supply line pressurized, one of two NC SOVs in control module 411 can be energized to open the ICV 412A in coordination with the pressure in the supply line, and one of two NC SOVs in control module 413 can be energized to open ICV 412B in coordination with the pressure in the supply line, or both can occur simultaneously. In another example, with the supply line pressurized, one of two NC SOVs in control module 411 (e.g., NC SOV 220) can be energized to close ICV 412A in coordination with the pressure in the supply line, and one of two NC SOVs in control module 413 can be energized to close ICV 412B in coordination with the pressure in the supply line, or both can occur simultaneously. Thus, stacking the control modules allows the system to use a shared hydraulic line(s) for control of a plurality of ICVs. In a single control module configuration, the hydraulic line terminates within or proximate to the "last" or "stack termination" control module (i.e., the last control module in the series).

While the aspects of the disclosure are described with reference to various implementations and exploitations, it will be understood that these aspects are illustrative. In general, techniques for opening and closing ICVs as described herein may be implemented with facilities consistent with any hardware system or hardware systems. Many variations, modifications, additions, and improvements are possible. For instance, some embodiments may split the components of the disclosed electro-hydraulic controller into different housings. This may be done to satisfy space constraints. When components of the electro-hydraulic controller are disposed within different housings, a tee block or a flow divider is used for branching of hydraulic lines into the different housings. In addition, embodiments are not limited to placement of the dynamic flow regulator as disclosed herein. While the disclosed illustrations are based on a preference to place the dynamic flow regulator proximate to the ICV actuated by the electro-hydraulic controller, embodiments can place the dynamic flow regulator anywhere on a hydraulic line among the components that form an electro-hydraulic controller. In embodiments with components disposed within different housings, a dynamic flow regulator may be disposed within each housing or fewer than all of the housings.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment #1: A system comprising: tubing; an interval control valve (ICV) coupled to the tubing, the ICV having an open side and a close side; a first hydraulic conduit and a second hydraulic conduit coupled with a hydraulic power system; a first electrical power line and a second electrical power line coupled with an electrical power source; and a set of one or more housings that enclose, a first one-way flow regulator coupled with the first hydraulic conduit and hydraulically coupled with a first normally closed (NC) solenoid valve (SOV) and a second NC SOV; the first NC SOV coupled with the first electrical power line; the second NC SOV coupled with the second electrical power line; a second one-way flow regulator coupled with the second hydraulic conduit and hydraulically coupled with the first NC SOV and the second NC SOV; a first dynamic flow regulator having a first port that is hydraulically coupled to the first NC SOV, and having a second port that is hydraulically coupled to the close side of the ICV; and a second dynamic flow regulator having a first port that is hydraulically coupled to the second NC SOV and having a second port hydraulically coupled to the open side of the ICV.

Embodiment #2: The system of Embodiment 1, wherein the first and second dynamic flow regulators are hydraulically coupled to the ICV via a third hydraulic conduit and a fourth hydraulic conduit, respectively.

Embodiment #3: The system of any one of Embodiments 1-2, wherein the second port of the first dynamic flow regulator is hydraulically coupled with a first port of a first filter and a second port of the first filter is hydraulically coupled to the close side of the ICV, the second port of the second dynamic flow regulator is hydraulically coupled with a first port of a second filter, and the second port of the second filter is hydraulically coupled to the open side of the ICV.

Embodiment #4: The system of any one of Embodiments 1-3, wherein the first dynamic flow regulator and the second dynamic flow regulator each have an automatically adjustable variable-metering orifice.

Embodiment #5: The system of any one of Embodiments 1-4, wherein the first dynamic flow regulator and the second dynamic flow regulator are configured to maintain a constant differential pressure across each dynamic flow regulator.

Embodiment #6: The system of any one of Embodiments 1-5, wherein the first one-way flow regulator being hydraulically coupled with the first and second NC SOVs comprises the first one-way flow regulator being hydraulically coupled with a P-port of the first NC SOV and a P-port of the second NC SOV, and wherein the second one-way flow regulator being hydraulically coupled with the first and second NC SOVs comprises the second one-way flow regulator being hydraulically coupled with a R-port of the first NC SOV and a R-port of the second NC SOV.

Embodiment #7: The system of Embodiment 6, wherein the first dynamic flow regulator having the first port that is hydraulically coupled to the first NC SOV comprises the first port of the first dynamic flow regulator being hydraulically coupled to an X-port of the first NC SOV, and wherein the second dynamic flow regulator having the first port that is hydraulically coupled to the second NC SOV comprises the first port of the second dynamic flow regulator being hydraulically coupled to an X-port of the second NC SOV.

Embodiment #8: An apparatus comprising: a first hydraulic conduit and a second hydraulic conduit; a first one-way flow regulator hydraulically coupled with the first hydraulic conduit and hydraulically coupled with a first normally closed (NC) solenoid valve (SOV) and a second NC SOV; a second one-way flow regulator hydraulically coupled with a second hydraulic conduit and hydraulically coupled with the first NC SOV and the second NC SOV; a first dynamic flow regulator that is hydraulically coupled with the first NC SOV; and a second dynamic flow regulator that is hydraulically coupled with the second NC SOV.

Embodiment #9: The apparatus of Embodiment 8, wherein the first one-way flow regulator being hydraulically coupled with the first and second NC SOVs comprises the first one-way flow regulator being hydraulically coupled with a P-port of the first NC SOV and a P-port of the second NC SOV, and wherein the second one-way flow regulator being hydraulically coupled with the first and second NC SOVs comprises the second one-way flow regulator being hydraulically coupled with a R-port of the first NC SOV and a R-port of the second NC SOV.

Embodiment #10: The apparatus of Embodiment 9, wherein the first dynamic flow regulator being hydraulically coupled with the first NC SOV comprises a first port of the first dynamic flow regulator being hydraulically coupled with an X-port of the first NC SOV, and wherein the second dynamic flow regulator being hydraulically coupled with the second NC SOV comprises a first port of the second dynamic flow regulator being hydraulically coupled to an X-port of the second NC SOV.

Embodiment #11: The apparatus of Embodiment 10, wherein a second port of the first dynamic flow regulator is adapted to be hydraulically coupled with a close side of an interval control valve (ICV) that is distinct from the apparatus and a second port of the second dynamic flow regulator is adapted to be hydraulically coupled with an open side of an interval control valve (ICV) that is distinct from the apparatus.

Embodiment #12: The apparatus of any one of Embodiments 10-11, further comprising a first filter adapted to be hydraulically coupled between a second port of the first dynamic flow regulator and a close side of an interval control valve (ICV) that is distinct from the apparatus, and a second filter adapted to be hydraulically coupled between a second port of the second dynamic flow regulator and an open side of an ICV that is distinct from the apparatus.

Embodiment #13: An apparatus comprising: a first hydraulic conduit and a second hydraulic conduit; a first normally closed (NC) solenoid valve (SOV) and a second NC SOV; a first dynamic flow regulator hydraulically coupled with the first NC SOV; a second dynamic flow regulator hydraulically coupled with the second NC SOV; an inverse shuttle valve hydraulically coupled between the first hydraulic conduit and both of the first and the second NC SOVs and hydraulically coupled between the second hydraulic conduit and both of the first and second NC SOVs; and a shuttle valve hydraulically coupled between the first hydraulic conduit and both the first and second NC SOVs and hydraulically coupled between the second hydraulic conduit and both the first and second NC SOVs.

Embodiment #14: The apparatus of Embodiment 13, wherein the first dynamic flow regulator being hydraulically coupled with the first NC SOV comprises a first port of the first dynamic flow regulator being hydraulically coupled with an X-port of the first NC SOV and wherein the second dynamic flow regulator being hydraulically coupled with the second NC SOV comprises a first port of the second dynamic flow regulator being hydraulically coupled with an X-port of the second NC SOV.

Embodiment #15: The apparatus of Embodiment 14 further comprising a first filter and a second filter, wherein a first port of the first filter is hydraulically coupled with a second port of the first dynamic flow regulator and a second port of the first filter is adapted to hydraulically couple with a close side of an interval control valve and wherein a first port of the second filter is hydraulically coupled with a second port of the second dynamic flow regulator and a second port of the second filter is adapted to hydraulically couple with an open side of an interval control valve.

Embodiment #16: The apparatus of any one of Embodiments 13-15, wherein the inverse shuttle valve being hydraulically coupled between the first hydraulic conduit and both of the first and the second NC SOVs and hydraulically coupled between the second hydraulic conduit and both of the first and the second NC SOVs comprises an A-port of the inverse shuttle valve being hydraulically coupled with the first hydraulic line, a B-port of the inverse shuttle valve being hydraulically coupled with the second hydraulic line, and a C-port of the inverse shuttle valve being hydraulically coupled with an R-port of the first NC SOV and with an R-port of the second NC SOV.

Embodiment #17: The apparatus of any one of Embodiments 13-16, wherein the shuttle valve being hydraulically coupled between the first hydraulic conduit and both of the first and the second NC SOVs and hydraulically coupled between the second hydraulic conduit and both of the first and the second NC SOVs comprises an A-port of the shuttle valve being hydraulically coupled with the first hydraulic line, a B-port of the shuttle valve being hydraulically coupled with the second hydraulic line, and a C-port of the shuttle valve being hydraulically coupled with a P-port of the first NC SOV and with a P-port of the second NC SOV.

Embodiment #18: The apparatus of any one of Embodiments 13-17 further comprising a housing.

Embodiment #19: The apparatus of any one of Embodiments 13-18, wherein the first dynamic flow regulator and the second dynamic flow regulator each have an automatically adjustable variable-metering orifice.

Embodiment #20: The apparatus of any one of Embodiments 13-19, wherein the first dynamic flow regulator and the second dynamic flow regulator are configured to maintain a constant differential pressure across each dynamic flow regulator.

What is claimed is:

1. An apparatus comprising:
a first hydraulic conduit and a second hydraulic conduit;
a first normally closed (NC) solenoid valve (SOV) and a second NC SOV;
a first dynamic flow regulator hydraulically coupled with the first NC SOV;
a second dynamic flow regulator hydraulically coupled with the second NC SOV;
an inverse shuttle valve hydraulically coupled between the first hydraulic conduit and both of the first and the second NC SOVs and hydraulically coupled between the second hydraulic conduit and both of the first and second NC SOVs; and
a shuttle valve hydraulically coupled between the first hydraulic conduit and both the first and second NC SOVs and hydraulically coupled between the second hydraulic conduit and both the first and second NC SOVs.

2. The apparatus of claim 1, wherein the first dynamic flow regulator being hydraulically coupled with the first NC SOV comprises a first port of the first dynamic flow regulator being hydraulically coupled with an X-port of the first NC SOV and wherein the second dynamic flow regulator being hydraulically coupled with the second NC SOV comprises a first port of the second dynamic flow regulator being hydraulically coupled with an X-port of the second NC SOV.

3. The apparatus of claim 1, further comprising a first filter and a second filter, wherein a first port of the first filter is hydraulically coupled with a second port of the first dynamic flow regulator and a second port of the first filter is adapted to hydraulically couple with a close side of an interval control valve and wherein a first port of the second filter is hydraulically coupled with a second port of the second dynamic flow regulator and a second port of the second filter is adapted to hydraulically couple with an open side of the interval control valve.

4. The apparatus of claim 1, wherein the inverse shuttle valve being hydraulically coupled between the first hydraulic conduit and both of the first and the second NC SOVs and hydraulically coupled between the second hydraulic conduit and both of the first and the second NC SOVs comprises an A-port of the inverse shuttle valve being hydraulically coupled with the first hydraulic line, a B-port of the inverse shuttle valve being hydraulically coupled with the second hydraulic line, and a C-port of the inverse shuttle valve being hydraulically coupled with an R-port of the first NC SOV and with an R-port of the second NC SOV.

5. The apparatus of claim 1, wherein the shuttle valve being hydraulically coupled between the first hydraulic conduit and both of the first and the second NC SOVs and hydraulically coupled between the second hydraulic conduit and both of the first and the second NC SOVs comprises an A-port of the shuttle valve being hydraulically coupled with the first hydraulic line, a B-port of the shuttle valve being hydraulically coupled with the second hydraulic line, and a C-port of the shuttle valve being hydraulically coupled with a P-port of the first NC SOV and with a P-port of the second NC SOV.

6. The apparatus of claim 1, further comprising a housing.

7. The apparatus of claim 1, wherein the first dynamic flow regulator and the second dynamic flow regulator each have an automatically adjustable variable-metering orifice.

8. The apparatus of claim 1, wherein the first dynamic flow regulator and the second dynamic flow regulator are configured to maintain a constant differential pressure across each dynamic flow regulator.

* * * * *